US008217783B2

(12) United States Patent
Mekid et al.

(10) Patent No.: US 8,217,783 B2
(45) Date of Patent: Jul. 10, 2012

(54) METHOD OF CONSERVING ENERGY AND WATER USING AN APPARATUS TO LOCATE LEAKS IN SUBSURFACE PIPELINES

(75) Inventors: Samir Mekid, Dhahran (SA); Abdelhafid Bouhraoua, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/190,380

(22) Filed: Jul. 25, 2011

(65) Prior Publication Data

US 2011/0298609 A1     Dec. 8, 2011

(51) Int. Cl.
    *G08B 1/08* (2006.01)
(52) U.S. Cl. ........... 340/539.1; 340/539.24; 340/539.26; 340/605; 340/577
(58) Field of Classification Search ............... 340/539.1, 340/539.24, 539.26, 605, 577
    See application file for complete search history.

(56) References Cited

U.S. PATENT DOCUMENTS

| 6,478,229 | B1 | 11/2002 | Epstein |
| 7,466,233 | B2 | 12/2008 | Drapala et al. |
| 2003/0189490 | A1 | 10/2003 | Hogerton et al. |
| 2007/0057769 | A1 | 3/2007 | Corbett, Jr. |
| 2008/0173109 | A1 | 7/2008 | Cogen et al. |
| 2009/0201158 | A1 | 8/2009 | Kato et al. |
| 2009/0236429 | A1 | 9/2009 | Hioki |
| 2010/0090802 | A1* | 4/2010 | Nilsson et al. ............... 340/10.1 |
| 2010/0201118 | A1* | 8/2010 | Anton et al. ................... 285/93 |
| 2010/0320755 | A1* | 12/2010 | Williams et al. .............. 285/355 |
| 2011/0227721 | A1* | 9/2011 | Mezghani et al. ......... 340/539.1 |

FOREIGN PATENT DOCUMENTS

| EP | 1772659 | 4/2007 |
| GB | 2432602 | 5/2007 |
| KR | 100877073 | 1/2009 |
| WO | WO 2006119279 | 11/2006 |
| WO | WO 2008150215 | 12/2008 |

\* cited by examiner

*Primary Examiner* — Daryl Pope
(74) *Attorney, Agent, or Firm* — Richard C. Litman

(57) ABSTRACT

A method of conserving energy and natural resources transported in subsurface pipelines and preventing environmental contamination therefrom by identifying the subsurface location of leaks of oil, gas, water or other natural resources transported in these pipelines includes adhering a continuous tape having a plurality of uniquely identified radio frequency identification (RFID) tags mounted thereon axially along the pipeline and use of a mobile robotic device to identify the specific location of a leak in the pipeline, thereby preventing loss of energy and water traveling through pipeline, contamination of these fluids and environmental contamination, and the use of additional fuel to replenish these lost natural resources.

13 Claims, 5 Drawing Sheets

US 8,217,783 B2

METHOD OF CONSERVING ENERGY AND WATER USING AN APPARATUS TO LOCATE LEAKS IN SUBSURFACE PIPELINES

BACKGROUND OF THE INVENTION

1. Field of the Invention

The present invention relates to a method for detecting the location of leaks in subsurface pipelines, and particularly to conserving energy, such as fuel or natural gas, or conserving water, desalinated or purified, transported through these pipelines by employing an apparatus that uses radio frequency identification (RFID) tags inside the buried pipelines to locate the specific site of leakage of the fuel, gas or water from the pipeline, thereby preserving these natural resources. The invention reduces the unnecessary use of energy to replace the processed water or fossil fuel that is lost through leakage under the surface, and prevents resulting environmental contamination from leakage for which the location is not detected.

2. Description of the Related Art

In regions of the world where fresh water is virtually non-existent, the principal source of water is through the energy intensive desalination of seawater. Large amounts of fossil fuels are used in the desalination process, and pipelines of relatively expensive drinking water are buried below the surface to transport the water to inland populations. Unfortunately, leaks in these pipelines are common and are not easily located. It has been reported that 30% of the water transported across the Kingdom of Saudi Arabia (KSA) is lost through leakage. The need to conserve this limited resource is compounded by the additional cost to replenish the leaked water by producing additional desalinated water through even further use of fuel. Leaks in water pipelines, while far from being a new problem, are escalating with increasing population growth in the desert areas. The undetected leaks also expose the water flowing through these pipes to subsurface contaminants and carcinogenic agents that may exist under the surface.

Similarly, leaks in oil and natural gas pipelines cause environmentally harmful damage to surrounding areas, as well as loss of valuable energy resources transported by pipelines. While the environmental damage associated with the loss of oil and natural gas (a potent green house gas) is more widely reported, significant losses of processed gas, oil or water require a corresponding additional amount of energy generation, resulting in additional pollution and millions of dollars in wasted energy. Furthermore, the problems of leakage can result in hazardous contaminants into the fuel or gas, and water distributed worldwide. It has been reported by a group of medical doctors from the department of Oncology, King Faisal Specialist Hospital, Riyadh, Saudi Arabia, that water contamination causing esophageal cancer at the Qassim region in the Kingdom of Saudi Arabia constitutes a major health risk and problem there. Furthermore, leaks can cause major infrastructure problems by undermining ground stability and, in the process, damaging roads and buildings.

To address these very significant environmental issues, a great deal of research and technology development has been accomplished in the last two decades to detect leaks in pipelines. The terms leak or leakage, when referring to a pipeline, should be taken to include any pipeline defect capable of allowing leakage, even if that pipeline defect is not leaking at any one particular time. Leak detection devices include acoustic leak detection, leak noise correlators, surface listening devices, ground penetrating radar detection methods, and chemical tracing methods, as well as X-Ray and infrared radiation methods. In a recent study, the use of leak noise correlators proved unreliable and costly, in addition to being time-consuming. The use of electronic sound detectors proved more reliable and cost effective. The detectors were placed manually as close as possible to the pipelines. However, sound detectors have proven to be a less than ideal solution.

More recently, robotic detectors have been developed to travel inside pipelines to perform leak detection. Some of these devices are known as conventional pipe inspection units, such as pipe inspection gages (PIGs) or present free-swimming robots. However, pipeline networks can be many hundreds or thousands of miles in length and can present widely varying currents and other conditions to these PIGs. Furthermore, the precise and repeatable determination of the location of leakage within each pipe section is important to analyzing and preventing or mitigating pipeline leakage, especially since many of these leaks are in difficult to identify locations buried underground. Thus, a method of conserving energy and water using an apparatus to locate leaks in subsurface pipelines solving the aforementioned problems is desired.

SUMMARY OF THE INVENTION

The method of conserving energy and water using an apparatus to locate leaks in subsurface pipelines includes the steps of adhering an elongated continuous tape having ribbons of Radio-Frequency Identifier (RFID) tags mounted thereon to the inner wall of a pipeline, the RFID tags being encoded with and configured to transmit identifiers uniquely identifying each tag; recording the RFID tag identifiers as the tape is being installed in the pipeline using an RFID reader and a recording medium; associating the RFID tag identifiers with a map location of a section of pipeline by comparing the length of tape from the pipeline opening to the RFID tag with a map or plat of the pipeline; equipping a mobile pipeline leak detector device with an RFID tag reader; sending the mobile pipeline leak detector through the pipeline; reading the identifier of an RFID tag in a section of pipeline having a leak using the RFID reader on the mobile leak detector; receiving the RFID tag identifier by RF signal when the pipeline is made of a material permitting transmission of RF signals by the mobile leak detector; storing the RFID tag identifier and subsequently retrieving the RFID tag identifier when the pipeline shields RF signals; and associating the RFID tag identifier at the location of the leak with the map location of the pipeline leak. The pipeline may transport a water supply, a fuel (such as natural gas or a petroleum-based fuel), or other natural resource.

The apparatus includes a supply roll of tape having ribbons of RFID tags mounted on one side of the tape and a layer of adhesive on the opposite side of the tape. The roll includes a backing or release tape covering the RFID tags to prevent the tape from adhering to the tags when the tape is wound into a roll. The RFID tags may also be coated with a protective coating to insulate the tags from the fluid being transported in the pipeline, when necessary.

The apparatus also includes a mobile device referred to herein as an RFID applicator for adhering the tape to the inner wall of the pipeline. The applicator includes a triangular front wall having three spring-biased legs extending from the vertices or corners of the triangular wall, the legs terminating in rollers or wheels adapted for engaging or bearing against the inner surface of the pipeline at three spaced apart points. The supply roll of RFID tags is mounted for rotation on an axis supported by the triangular front wall, the supply roll being mounted transversely on the wall. The tape is unwound and guided so that the tape passes between one of the rollers and the inner wall of the pipeline, the roller pressing the tape against the wall of the pipeline to adhere the tape thereto, the roller bearing against the backing or release side of the tape. The applicator includes a rear support wall having two or three rollers or wheels mounted thereon that are adapted for engaging the pipeline wall. The rear support includes a motor, a controller, and a drive mechanism for driving the rollers so that the device may be operated as a robotic device by remote control. A frame member extends between the front wall and the rear support wall, the frame member supporting an RFID tag reader and a take-up reel. The tape backing is wound on the take-up reel as the tape is applied to the inner wall of the pipeline. The take-up reel may include a drive mechanism synchronized to advance or pull the tape of RFID tags from the supply roll as the RFID applicator advances through the pipeline.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
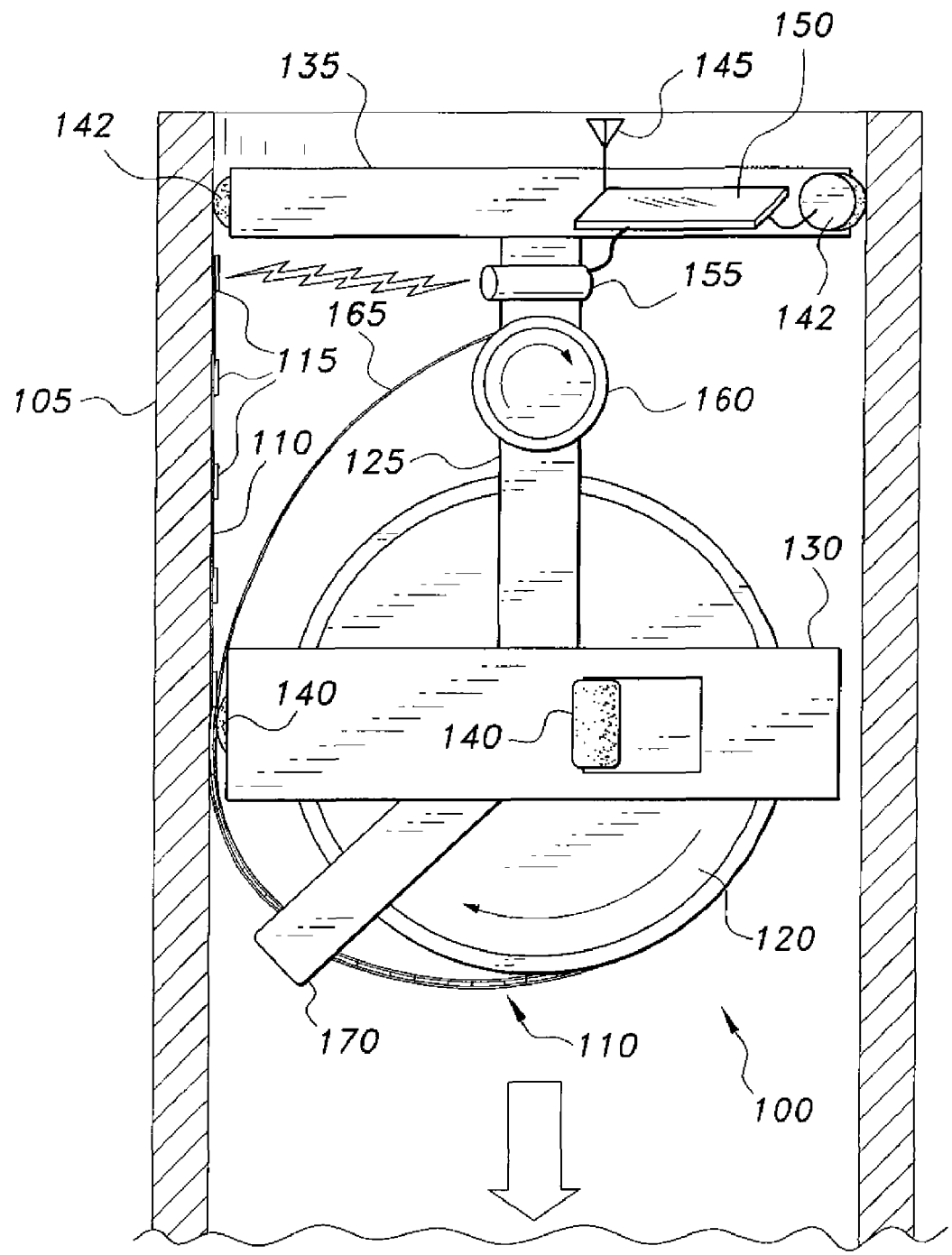
FIG. 1 is a diagrammatic, environmental, top view of an RFID applicator apparatus for conserving energy and water using an apparatus to locate leaks in subsurface pipelines according to the present invention.

The method of conserving energy and water using an apparatus to locate leaks in subsurface pipelines includes the steps of adhering an elongated continuous tape having ribbons of Radio-Frequency Identifier (RFID) tags mounted thereon to the inner wall of a pipeline, the RFID tags being encoded with and configured to transmit identifiers uniquely identifying each tag; recording the RFID tag identifiers as the tape is being installed in the pipeline using an RFID reader and a recording medium; associating the RFID tag identifiers with a map location of a section of pipeline by comparing the length of tape from the pipeline opening to the RFID tag with a map or plat of the pipeline; equipping a mobile pipeline leak detector device with an RFID tag reader; sending the mobile pipeline leak detector through the pipeline; reading the identifier of an RFID tag in a section of pipeline having a leak using the RFID reader on the mobile leak detector; receiving the RFID tag identifier by RF signal when the pipeline is made of a material permitting transmission of RF signals by the mobile leak detector; storing the RFID tag identifier and subsequently retrieving the RFID tag identifier when the pipeline shields RF signals; and associating the RFID tag identifier at the location of the leak with the map location of the pipeline leak. The pipeline may transport a water supply, a fuel (such as natural gas or a petroleum-based fuel), or other natural resource.

The apparatus includes a supply roll of tape having ribbons of RFID tags mounted on one side of the tape and a layer of adhesive on the opposite side of the tape. The roll includes a backing or release tape covering the RFID tags to prevent the tape from adhering to the tags when the tape is wound into a roll. The RFID tags may also be coated with a protective coating to insulate the tags from the fluid being transported in the pipeline, when necessary.

The apparatus also includes a mobile device referred to herein as an RFID applicator for adhering the tape to the inner wall of the pipeline. The applicator includes a triangular front wall having three spring-biased legs extending from the vertices or corners of the triangular wall, the legs terminating in rollers or wheels adapted for engaging or bearing against the inner surface of the pipeline at three spaced apart points. The supply roll of RFID tags is mounted for rotation on an axis supported by the triangular front wall, the supply roll being mounted transversely on the wall. The tape is unwound and guided so that the tape passes between one of the rollers and the inner wall of the pipeline, the roller pressing the tape against the wall of the pipeline to adhere the tape thereto, the roller bearing against the backing or release side of the tape. The applicator includes a rear support wall having two or three rollers or wheels mounted thereon that are adapted for engaging the pipeline wall. The rear support includes a motor, a controller, and a drive mechanism for driving the rollers so that the device may be operated as a robotic device by remote control. A frame member extends between the front wall and the rear support wall, the frame member supporting an RFID tag reader and a take-up reel. The tape backing is wound on the take-up reel as the tape is applied to the inner wall of the pipeline. The take-up reel may include a drive mechanism synchronized to advance or pull the tape of RFID tags from the supply roll as the RFID applicator advances through the pipeline.

According to the present method, accurate position information is used to more precisely and repeatably identify the location of leaks and to identify the pipe sections in which those leaks occur. The precise identification of the position of existing leaks is used to correct those leaks in a more efficacious manner. The identification of the position of existing leaks also allows the identification of pipeline sections in which those leaks occur, thereby providing the basis for statistical analysis of the pipe sections to identify common underlying problems associated with leakage, such as the identification of deficient pipeline sections that are metallurgically similar. The method provides a more accurate and reliable method for determining position information in the internal pipeline environment through a consistent application of radio frequency identification (RFID) tags, as described herein, to better enable prevention or mitigation of leakage and the associated environmental impacts associated with that leakage.

Figure 3A:
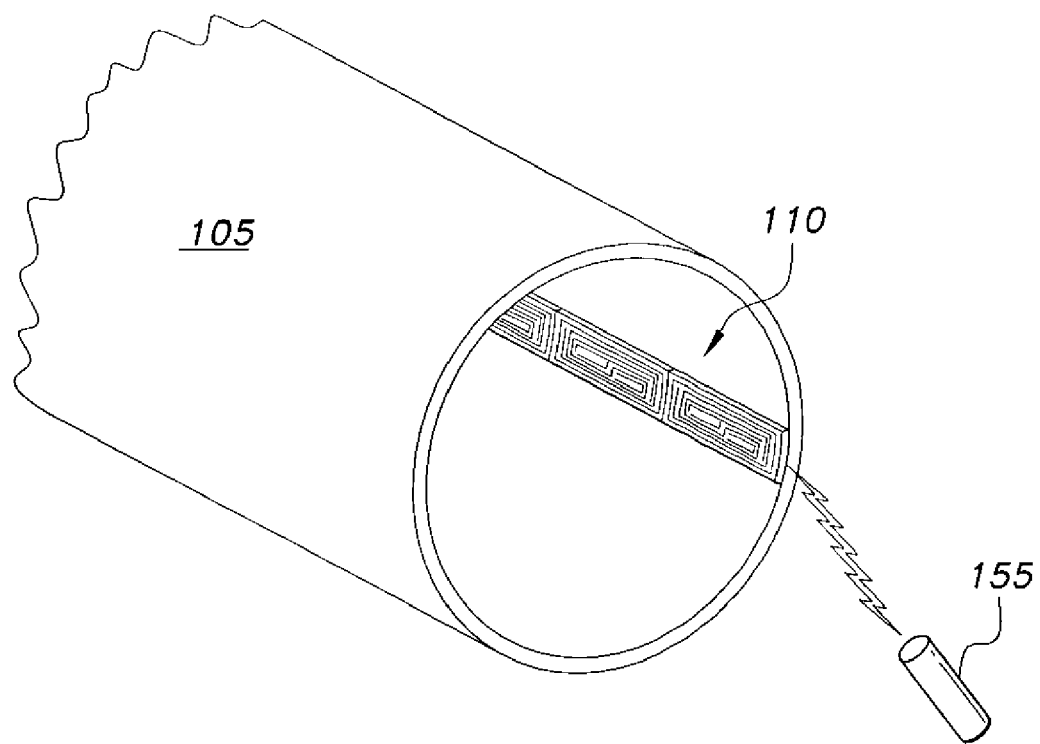
FIG. 3A is a diagrammatic, environmental, perspective view of a tape of RFID tags adhered to the inner wall of a pipeline in accordance with a method or conserving energy and water using an apparatus to locate leaks in subsurface pipelines according to the present invention.
Figure 3B:
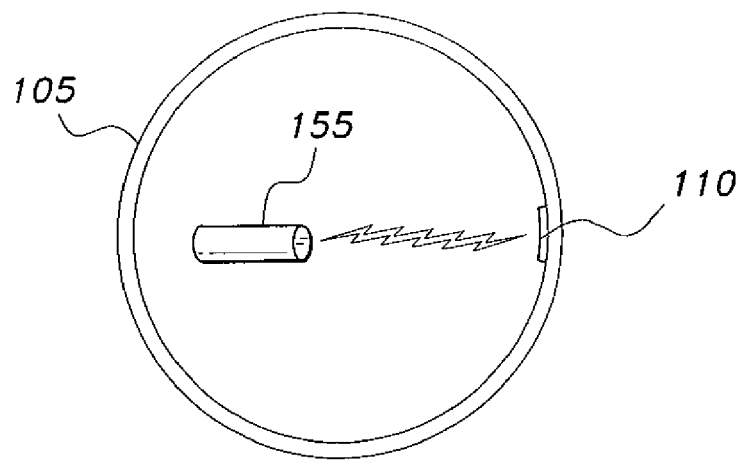
FIG. 3B is a diagrammatic, environmental, view of an RFID reader receiving a signal from one of the RFID tags of FIG. 3A in a method for conserving energy and water using an apparatus to locate leaks in subsurface pipelines according to the present invention.

As shown in FIG. 1, a controllable radio frequency identification (RFID) tag and tape applicator 100 fits inside a pipeline 105. The RFID applicator 100 contains an RFID tape 110 having ribbons of RFID tags 115 mounted thereon, the tape 110 being wound around a supply roller 120. The RFID tags 115 are positioned serially on the RFID tape 110. The RFID tags 115 are of a type used in the marketplace today and include an antenna for communication with a reader and a small digital chip for storing a unique identification code, as shown in FIG. 3A and FIG. 3B. The RFID tags 115 can be protected by a film coating, depending on the type of natural resource fluid (water, natural gas, petroleum based products, etc.) circulating inside the pipeline. RFIDs use radio frequencies that can penetrate most natural resources, such as those transported in pipelines 105. Furthermore, precise positioning of the reader to receive an RFID signal is not necessary because the radio frequencies allow for receipt of signals at a greater distance. This can be useful in the internal pipeline environment that may have a wide variety of different physical conditions, including varying flow rates and turbulence.

Figure 2:
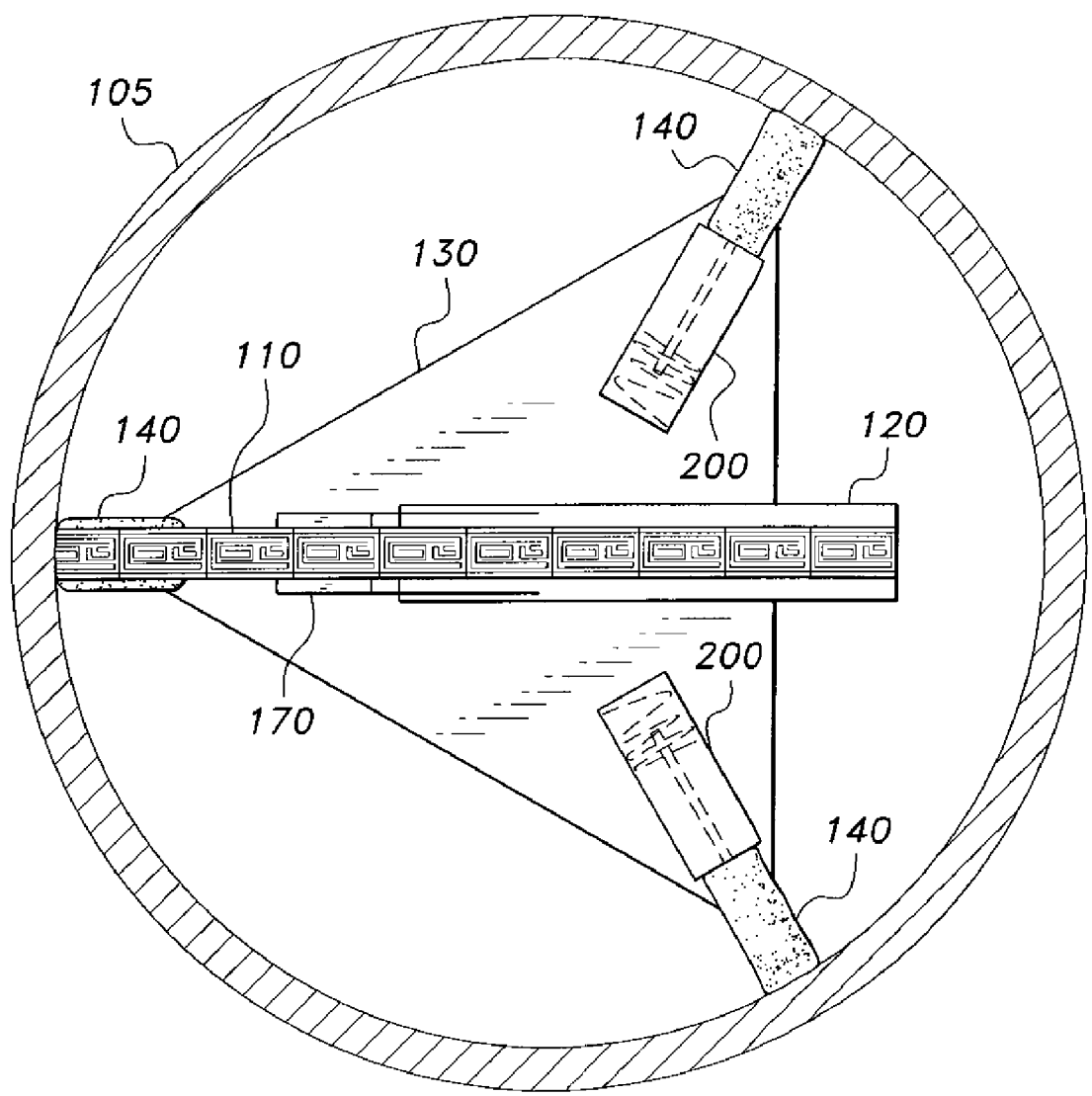
FIG. 2 is a diagrammatic, environmental, front view of the RFID applicator of FIG. 1.

The RFID applicator 100 has a physical applicator includes a triangular front wall 130, better seen in FIG. 2. Two of three pipeline rollers 140 are shown here in FIG. 1, while all three can be seen in FIG. 2. In the preferred embodiment, the pipeline rollers 140 mounted on the front wall 130 are not motorized, but are spring-biased (as shown in phantom in FIG. 2) to press against the inside of the pipeline 105 to provide stability to the RFID applicator 100, but other configurations, including motorization of the forward pipeline rollers 140, are envisioned. The applicator 100 also includes a frame member extending rearward, and a rear support wall 135. The rear support wall 135 has at least one motorized pipeline roller 142 mounted thereon (portions of two rollers are shown). The motorized roller 142 can be controlled autonomously, semi-autonomously or remotely by an operator using a terminal connected wirelessly, as conventionally known in the art of robotics.

An antenna 145 of an RF transmitter or transceiver exchanges position information and control signals wirelessly with the operator. The availability and range of wireless communication depends in part on the materials of which the pipeline is constructed. In some cases, data from the RFID applicator 100 is stored and retrieved by control circuitry 150 on the RFID applicator 100 after the RFID applicator 100 arrives at a data or device collection point. The antenna 145 is also coupled to the motorized pipeline roller 142 via a controller or control circuitry 150. Thus, the control circuitry 150 both controls the movement of the RFID applicator 100 inside the pipeline 105 and detection of applied RFID tags 115. The RFID applicator 100 also contains an RFID tag reader 155 mounted on the frame member 125 for polling the RFID tags 115 for identification as the RFID applicator 100 passes by the applied RFID tags 115. The RFID tag reader 155 can store the tag identifications in its memory, or memory on the control circuit 150, including the identification data received from an RFID tag 115 and position data associated with that RFID tag 115 relative to its position on the tape 110, i.e., the distance from the pipeline opening or other starting reference point. A take-up reel 160 takes up backing or release tape 165 that previously separated adhesive on the back side of the RFID tape 100 from the RFID tags 115 on the front side as they are wound around the supply roller 120 so that no waste is left in the pipeline 105 from the process of applying RFID tags 115 to the pipeline 105. The take-up reel 160 may be equipped with a drive mechanism that advances tape 110 from the supply roll 120 as the applicator 100 advances through the pipeline, and to advance the backing 165 on the take-up reel 160. A tape guide 170 is attached to the front wall 130 and used to keep the tape 110 properly positioned for application, as further described herein.

Turning to FIG. 2, the triangular front wall 130 of the physical applicator structure 125 includes three pipeline rollers 140. At least two of the three pipeline rollers 140 have extensible, spring-biased legs 200 to allow the RFID applicator 100 to be fitted for operation inside pipelines 105 of different diameters. One of the three pipeline rollers 140 is used to bring the RFID tape 110 into contact with inner wall of the pipeline 105 and to separate and adhesively apply the RFID tape 110 having RFID tags 115 to the inside of the pipeline 105. The RFID tags 115 are shown wound around the supply roller 120.

Turning to FIG. 3A, there is shown a perspective view of the pipeline 105 and the RFID tape 110 and RFID tags 115 after having been adhesively applied to the inside wall of the pipeline 105 by the RFID applicator 100. The RFID applicator 100 moves axially within the pipeline 105 and adhesively applies the RFID tape 110 to an inner wall of the pipeline 105 so that the adhesively attached RFID tags 115 form a linear series of RFID tags 115. The adhesively applied RFID tags 115 enable very high precision and accuracy regarding identification of location of both leaks and devices within the pipeline as well as the corresponding pipeline section by location. In this instance, the RFID reader 155 is shown as being outside the pipeline 105.

Turning to FIG. 3B, there is shown a diagrammatic view of the RFID tag reader 155 positioned inside the pipeline 105 to read identification information corresponding to a single specific RFID tag 115 in the RFID tape 110. As described with regard to FIG. 3A and elsewhere herein, the RFID tape 110 has been adhesively applied to the inside wall of the pipeline 105 by the RFID applicator 100. While the RFID reader 155 is shown as being inside the pipeline 105, depending on the range of the RFID/RFID detector combination and the type of pipeline materials used, e.g., polyvinyl chloride (PVC), steel, etc., the RFID reader may be used internally or externally to the pipeline 105. A similar RFID reader 155 may also be mounted on a robotic pipeline leak detector or other robotic pipeline maintenance or measurement device in order to determine the location of the leak or the robotic device in the pipeline, as described above.

Although the RFID reader detector 155 is shown reading data from a single specific RFID tag 115 on the RFID tape 110, other embodiments may also read data from adjacent RFID tags 115 and use that information for error correction and even more precise identification of location inside the pipeline 105. Those embodiments may use bundled RFID tag readers 155 or an RFID tag reader capable of rapid sequential or even simultaneous communications with multiple RFID tags 115.

Figure 4:
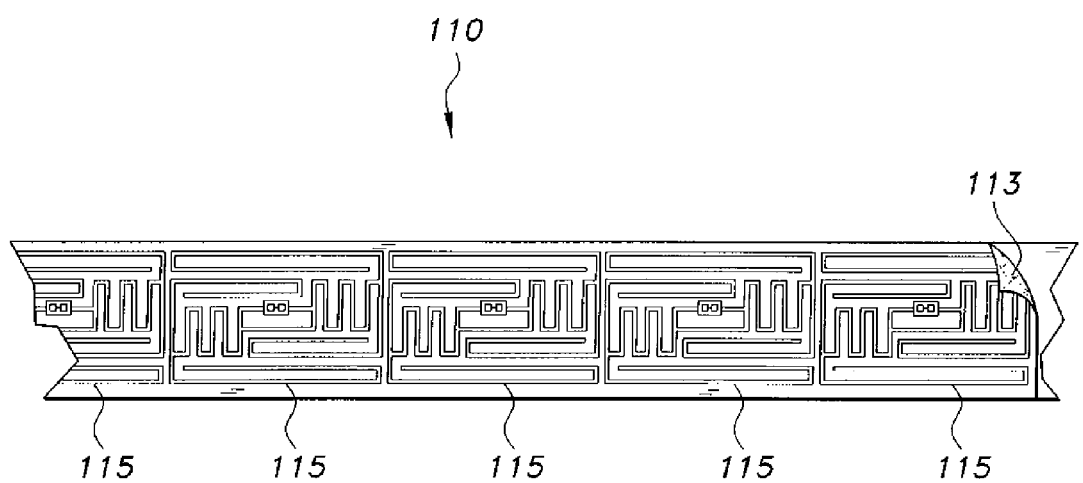
FIG. 4 is a partial front view of a tape having a ribbon of RFID tags mounted thereon in accordance with a method for conserving energy and water using an apparatus to locate leaks in subsurface pipelines according to the present invention, showing details of the ribbon.

Turning to FIG. 4, there is shown a partial view of the RFID tape 110 having the ribbon of RFID tags 115. Individual RFIDs 115 are positioned serially end-to-end as shown. The geometric pattern formed by each of generally rectangular RFIDs 115 is representative of an antenna structure associated with RFID devices. As shown the RFID tags 115 are packed tightly, but greater spacing of the ribbons can also be used as a cost-saving measure or to better isolate the signals associated with any individual RFID tag 115. The side of the tape 110 opposite the RFID tags 115 has a suitable layer of adhesive 113 to secure the tape 110 to the interior surface of the pipeline.

Figure 5:
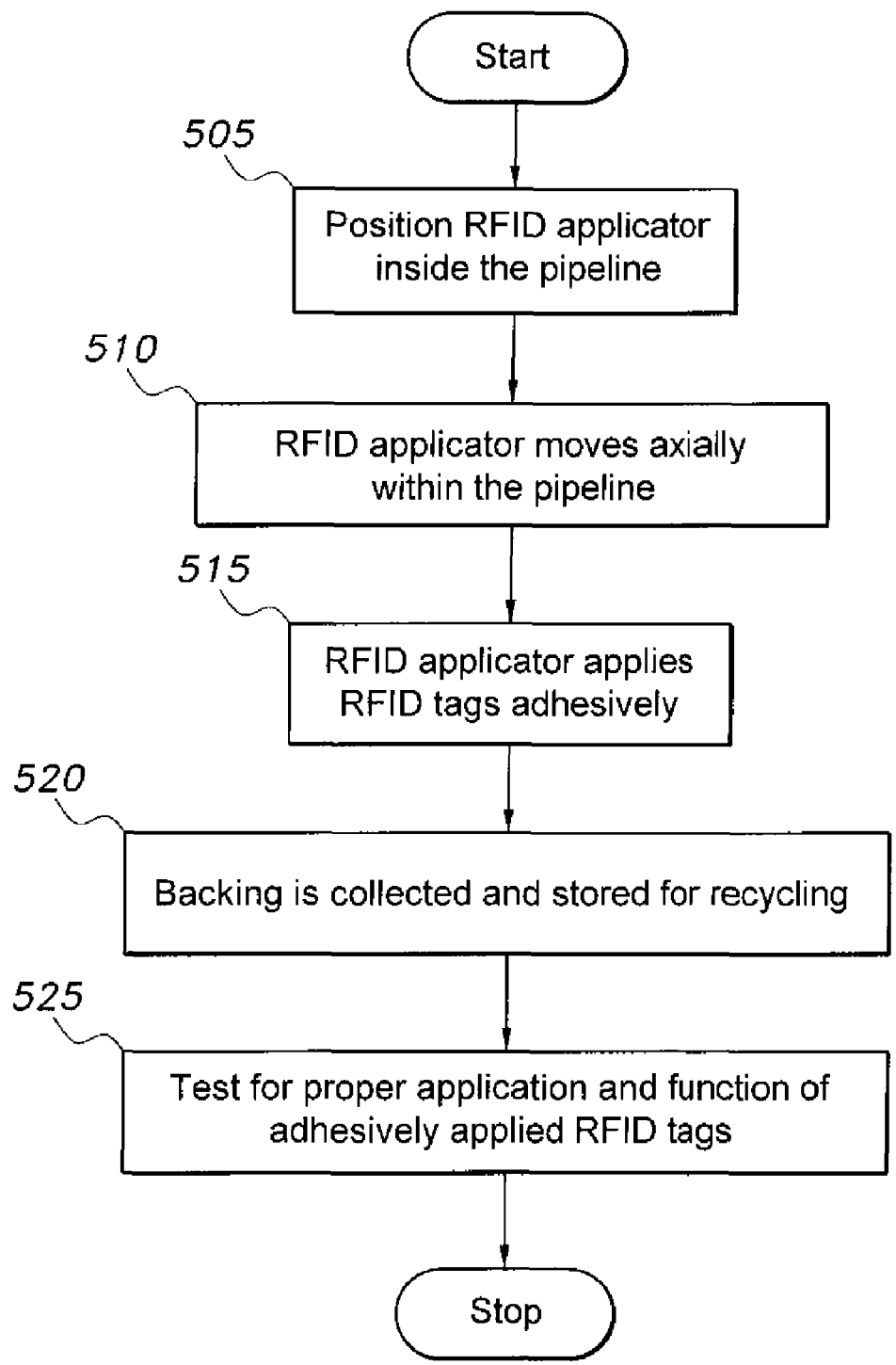
FIG. 5 is a flowchart showing steps in an exemplary method of applying a tape of RFID tags to the inner wall of a pipeline in accordance with a method for conserving energy and water using an apparatus to locate leaks in subsurface pipelines according to the present invention.

Turning to FIG. 5, there is shown a flowchart showing an exemplary method of applying RFIDs 115 and identifying position to conserve natural resources being transported by a pipeline 105. In step 505, the RFID applicator 100 is positioned inside the pipeline 105. If not previously added, the RFID tape 110 containing the RFID tags 115 is added to the RFID applicator 100. In step 510 the RFID applicator 100 is moved axially within the pipeline 105. The RFID applicator 100 is moved axially within the pipeline 105 in step 515, being driven by the at least one motorized pipeline roller 142. This can be accomplished semi-autonomously or remotely by an operator. The antenna 145 is used to exchange information with the operator. This can also be accomplished autonomously. As the RFID applicator 100 is moved through the inside of the pipeline 105, the RFID tape 110 is guided by the tape guide 170 to keep the tape properly positioned.

In step 515, the RFID tape 110 is pulled from the supply roller 120 and physically pressed against an inside surface of the pipeline 105 by one of the three pipeline rollers 140, as shown in FIG. 2. This causes the tape 110 to adhere to the inside of the pipeline 105. Suitable adhesive materials that can be applied through the application of pressure, depending upon the material that the pipeline is made from (polyvinyl chloride, concrete, metal, etc.) and the nature of the fluid circulating in the pipeline, are used and are well known in the art. Other adhesive methods can also be used, including other adhesives, magnets, etc., depending on the type of pipeline environment the RFID tags 115 and RFID applicator 100 is to be used in. In step 520, the backing or release tape 165 is collected and stored for later removal by being wound around the take-up reel 160. The backing 165 may be recyclable. This prevents any waste from the process of the applying the RFID tags 115 from remaining in the pipeline 105. Finally, in step 525, the RFID reader 155 is used to confirm the successful application of each RFID tag and its unique identifier. Because the RFID tags 115 are applied to the inside of the pipeline 105 with a known spacing, feedback from step 525 is used to build up a map of the pipeline 105 relative to the pipeline opening or other reference point as the RFID tags 115 are applied.

The described apparatus and method results in an improved pipeline capable of supporting devices, such as PIGs having RFID readers, with a very high degree of precision in location identification, which is desirable and useful in number of different useful ways. One way the method provides environmentally useful features is the highly accurate identification of position information. This enables repairs to be made more quickly because the location of any discovered leak or leaks is tightly constrained and precisely identified. This is especially important for subsurface leakage where the leaks are not readily observable from the surface. The spacing between the RFID tags 115 can range from zero to whatever is desired. Another environmentally useful features is that specific sections of the pipeline 105 in which leaks occur, or between which the leaks occur, can also be precisely identified, thereby leading to better identification of the original source of leakage as being associated with a particular material defect or workmanship defect, etc. This further enables the prediction of future leakage issues and locations and provides an opportunity to mitigate or eliminate those leaks potentially even before they happen, yielding significant environmental benefits in terms of saved natural resources and energy.

Yet another way in which the present invention provides environmentally useful features is that it enables the precise identification of a PIG's or other robot's position within the pipeline 105. Monitoring the progress and responsiveness of PIGs or other robots in the pipeline 105 helps to ensure that they are performing as expected. Deviations from normal behavior by PIGs or other robots can be identified early and complete failure by such devices may be avoided by the careful monitoring enabled by the present invention. For example, significant deviations in PIG velocity can be tracked and used to schedule PIG maintenance, replacement, etc.

It is to be understood that the present invention is not limited to the embodiments described above, but encompasses any and all embodiments within the scope of the following claims.

We claim:

1. A method of conserving energy and preventing environmental contamination by identifying the location of leaks of oil, gas, water or other natural resources transported in subsurface pipelines, comprising the steps of:
adhering an elongated continuous tape having ribbons of Radio-Frequency Identifier (RFID) tags mounted thereon axially to an inner wall of the pipeline, the RFID tags being encoded with and configured to transmit identifiers uniquely identifying each of the tags;
recording the RFID tag identifiers as the tape is being installed in the pipeline using an RFID reader and a recording medium;
associating the RFID tag identifiers with a map location of a section of the pipeline by comparing the length of tape from a starting point of the tape to the RFID tag with a map or plat of the pipeline;
equipping a mobile pipeline leak detector device with an RFID tag reader;
sending the mobile pipeline leak detector through the pipeline;
reading the identifier of an RFID tag in a section of the pipeline having a leak using the RFID reader on the mobile leak detector;
receiving the RFID tag identifier by wireless signal;
storing the RFID tag identifier; and
associating the RFID tag identifier at the location of the leak with the map location of the pipeline leak.

2. The method of conserving energy and preventing environmental contamination by identifying the location of leaks of oil, gas, water or other natural resources transported in subsurface pipelines according to claim 1, further comprising the step of repairing the leak at the location at the map location of the pipeline leak.

3. The method of conserving energy and preventing environmental contamination by identifying the location of leaks of oil, gas, water or other natural resources transported in subsurface pipelines, according to claim 1, further comprising the step of replacing sections of the pipeline at the location at the map location of the pipeline leak.

4. The method of conserving energy and preventing environmental contamination by identifying the location of leaks of oil, gas, water or other natural resources transported in subsurface pipelines according to claim 1, wherein the natural resource transported in the pipeline is water, said mobile pipeline leak detector device being configured for detecting water leakage from the pipeline.

5. The method of conserving energy and preventing environmental contamination by identifying the location of leaks of oil, gas, water or other natural resources transported in subsurface pipelines according to claim 1, wherein the natural resource transported in the pipeline is natural gas, said mobile pipeline leak detector device being configured for detecting gas leakage from the pipeline.

6. The method of conserving energy and preventing environmental contamination by identifying the location of leaks of oil, gas, water or other natural resources transported in subsurface pipelines according to claim 1, wherein the natural resource transported in the pipeline is a petroleum-based fuel, said mobile pipeline leak detector device being configured for detecting leakage of the petroleum-based fuel from the pipeline.

7. An apparatus for conserving energy and preventing environmental contamination by identifying the location of leaks of oil, gas, water or other natural resources transported in subsurface pipelines, comprising a radio frequency identification (RFID) applicator for applying a continuous adhesive tape having a plurality of RFID tags encoded with and configured to transmit serial identifiers uniquely identifying each tag to an interior surface of a wall of a pipeline transporting a natural resource, the RFID applicator having:
- a front wall having a plurality of spring-biased legs extending therefrom;
- a roller mounted on each of the legs, the rollers being biased to bear against and roll on the interior surface of the pipeline and spaced apart to support the front wall within the pipeline;
- a supply roller rotatably mounted on the front wall, the continuous tape of RFID tags being mounted on the supply roller;
- a rear wall having a plurality of rollers extending therefrom, the rollers being biased to bear against and roll on the interior surface of the pipeline and spaced apart to support the rear wall within the pipeline;
- a frame member extending between the front wall and the rear wall;
- a take-up reel mounted on the frame member;
- a guide mounted on the front wall, the tape being threadable through the guide, between one of the front wall rollers and the interior surface of the pipeline so that the tape is pressed against the pipeline wall to adhesively attach the continuous tape of RFID tags axially through the pipeline, the tape having a backing covering the RFID tags, the backing being separated from the RFID tags and threadable onto the take-up reel after adhesive attachment of the tape to the pipeline;
- a drive member connected to at least one of the rear wall rollers to propel the applicator through the pipeline;
- an RFID reader mounted on the frame, the reader being configured to communicate with the RFID tags; and
- a controller electrically connected to the RFID reader and to the drive member, the controller having circuitry to control movement of the applicator through the pipeline and to control the RFID reader.

8. The apparatus for conserving energy and preventing environmental contamination by identifying the location of leaks of oil, gas, water or other natural resources transported in subsurface pipelines, natural resources transported by pipeline according to claim 7, wherein said front wall is triangular, defining three corners, said spring-biased legs extending from the three corners.

9. The apparatus for conserving energy and preventing environmental contamination by identifying the location of leaks of oil, gas, water or other natural resources transported in subsurface pipelines, natural resources transported by pipeline according to claim 7, further comprising a radio frequency (RF) transceiver connected to said controller, the transceiver being configured to transmit RFID tag identifiers read by the RFID reader to a remote location.

10. The apparatus for conserving energy and preventing environmental contamination by identifying the location of leaks of oil, gas, water or other natural resources transported in subsurface pipelines, natural resources transported by pipeline according to claim 7, further comprising an electronic storage device connected to said controller, the storage device being configured for storage and subsequent retrieval of RFID tag identifiers read by said RFID reader.

11. An apparatus for conserving energy and preventing environmental contamination by identifying the location of leaks of oil, gas, water or other natural resources transported in subsurface pipelines, natural resources transported by pipeline, comprising a radio frequency identification (RFID) applicator having:
- a continuous adhesive tape having a plurality of RFID tags encoded with and configured to transmit serial identifiers uniquely identifying each of the tags;
- a triangular front wall defining three corners;
- a plurality of spring-biased front legs, the legs extending from the three corners of the front wall;
- a roller mounted on each of the legs, the rollers being biased to bear against and roll on the interior surface of a pipeline transporting a natural resource, the rollers being spaced apart to support the front wall within the pipeline;
- a supply roller rotatably mounted on the front wall, the continuous tape of RFID tags being mounted on the supply roller;
- a rear wall having a plurality of rollers extending therefrom, the rollers being biased to bear against and roll on the interior surface of the pipeline and spaced apart to support the rear wall within the pipeline;
- a frame member extending between the front wall and the rear wall;
- a take-up reel mounted on the frame member;
- a guide mounted on the front wall, the tape being threadable through the guide, between one of the front wall rollers and the interior surface of the pipeline so that the tape is pressed against the pipeline wall to adhesively attach the continuous tape of RFID tags axially through the pipeline, the tape having a backing covering the RFID tags, the backing being separated from the RFID tags and threadable onto the take-up reel after adhesive attachment of the tape to the pipeline;
- a drive member connected to at least one of the rear wall rollers to propel the applicator through the pipeline;
- an RFID reader mounted on the frame, the reader being configured to communicate with the RFID tags; and
- a controller electrically connected to the RFID reader and to the drive member, the controller having circuitry to control movement of the applicator through the pipeline and to control the RFID reader.

12. The apparatus for conserving energy and preventing environmental contamination by identifying the location of leaks of oil, gas, water or other natural resources transported in subsurface pipelines, natural resources transported by pipeline according to claim 11, further comprising a radio frequency (RF) transceiver connected to said controller, the transceiver being configured to transmit RFID tag identifiers read by the RFID reader to a remote location.

13. The apparatus for conserving energy and preventing environmental contamination by identifying the location of leaks of oil, gas, water or other natural resources transported in subsurface pipelines, natural resources transported by pipeline according to claim 11, further comprising an electronic storage device connected to said controller, the storage device being configured for storage and subsequent retrieval of RFID tag identifiers read by said RFID reader.

\* \* \* \* \*